US009756239B2

United States Patent
Okazawa et al.

(10) Patent No.: US 9,756,239 B2
(45) Date of Patent: Sep. 5, 2017

(54) IMAGE PROCESSING DEVICE, IMAGE PICKUP APPARATUS, AND IMAGE PROCESSING METHOD

(71) Applicant: OLYMPUS CORPORATION, Tokyo (JP)

(72) Inventors: Atsuro Okazawa, Hino (JP); Toshimasa Miura, Machida (JP); Ryusuke Tsuchida, Akiruno (JP)

(73) Assignee: OLYMPUS CORPORATION (JP)

( * ) Notice: Subject to any disclaimer, the term of this patent is extended or adjusted under 35 U.S.C. 154(b) by 328 days.

(21) Appl. No.: 14/680,207

(22) Filed: Apr. 7, 2015

(65) Prior Publication Data

US 2016/0080671 A1    Mar. 17, 2016

(30) Foreign Application Priority Data

Sep. 16, 2014  (JP) .................................. 2014-188044

(51) Int. Cl.
*H04N 5/365* (2011.01)
*H04N 5/232* (2006.01)
*H04N 5/367* (2011.01)

(52) U.S. Cl.
CPC ......... *H04N 5/23222* (2013.01); *H04N 5/365* (2013.01); *H04N 5/3675* (2013.01)

(58) Field of Classification Search
None
See application file for complete search history.

(56) References Cited

U.S. PATENT DOCUMENTS

| 2005/0195290 A1* | 9/2005 | Takeshita | H04N 9/735 348/223.1 |
| 2010/0149381 A1* | 6/2010 | Motomura | H04N 5/2258 348/235 |
| 2011/0205404 A1* | 8/2011 | Tamura | H04N 5/217 348/241 |

FOREIGN PATENT DOCUMENTS

| JP | 2007-081704 | 3/2007 |
| JP | 2011-228771 | 11/2011 |

* cited by examiner

*Primary Examiner* — Roberto Velez
*Assistant Examiner* — Yih-Sien Kao
(74) *Attorney, Agent, or Firm* — Ostrolenk Faber LLP

(57) ABSTRACT

An image processing device includes a shooting scene determining section that determines a shooting scene, a correlation evaluation value calculating section that calculates correlation evaluation values between a target pixel and surrounding pixels, a weight setting section that sets, when the shooting scene is a low correlation scene, heavy weights to the correlation evaluation value calculated from the surrounding pixels having high correlativities, an isolated-point degree calculating section that subjects the correlation evaluation values to weight addition to calculate an isolated-point degree, and an FPN correcting section that corrects a pixel value of the target pixel according to a magnitude of the isolated-point degree correction.

12 Claims, 11 Drawing Sheets

FIG. 10

|    |    | G1 |    |    |
|----|----|----|----|----|
|    | G2 |    | G8 |    |
| G3 |    | C  |    | G7 |
|    | G4 |    | G6 |    |
|    |    | G5 |    |    |

FIG. 11

| R1 |   | R8 |   | R7 |
|----|---|----|---|----|
|    |   |    |   |    |
| R2 |   | C  |   | R6 |
|    |   |    |   |    |
| R3 |   | R4 |   | R5 |

FIG. 14

| 70 | 70 | 10 |
|----|----|----|
| 70 | 80 | 10 |
| 10 | 10 | 10 |

FIG. 15

| 10 | 10 | 10 |
|----|----|----|
| 10 | 40 | 10 |
| 10 | 10 | 10 |

IMAGE PROCESSING DEVICE, IMAGE PICKUP APPARATUS, AND IMAGE PROCESSING METHOD

CROSS REFERENCE TO RELATED APPLICATION

This application claims benefit of Japanese Application No. 2014-188044 filed in Japan on Sep. 16, 2014, the entire contents of which are incorporated herein by this reference.

BACKGROUND OF THE INVENTION

1. Field of the Invention

The present invention relates to an image processing device that corrects a fixed pattern noise as an isolated point, an image pickup apparatus, and an image processing method.

2. Description of the Related Art

For an image pickup apparatus that converts an optical image of an object formed by an optical system into electric signals, various techniques have been proposed for correcting a fixed pattern noise as an isolated point generated from the image pickup apparatus (hereafter, referred to as an FPN as appropriate), for example including the following methods.

(1) Technique to store the position of an FPN in advance and correct the FPN in the stored position.

(2) Technique to correct an FPN based on the difference value between two images.

(2A) Technique to acquire an FPN image in a state where an image pickup device is shielded and subtract the FPN image from a normal shooting image to correct an FPN.

(2B) Technique to acquire two images different in exposure time without shielding an image pickup device, and subtract a short-time exposure image from a long-time exposure image to correct an FPN (e.g., refer to Japanese Patent Application Laid-Open Publication No. 2011-228771).

(3) Technique to detect an FPN from data on a shot image itself and correct the FPN (e.g., refer to Japanese Patent Application Laid-Open Publication No. 2007-81704).

SUMMARY OF THE INVENTION

An image processing device according to an aspect of the present invention includes a shooting scene determining section that determines whether the shooting scene of an acquired image is a low correlation scene containing an object as an isolated point at which correlativities between a target pixel and surrounding pixels positioned in proximity to the target pixel are low, a correlation evaluation value calculating section that calculates a plurality of correlation evaluation values representing correlativities between the target pixel and the plurality of surrounding pixels in the image, respectively, a weight setting section that sets, when the shooting scene of the image is the low correlation scene, weights heavier to the correlation evaluation values calculated from the surrounding pixels having high correlativities with the target pixel than when the shooting scene is not the low correlation scene, an isolated-point degree calculating section that subjects the plurality of correlation evaluation values calculated by the correlation evaluation value calculating section to weight addition according to the weights to calculate the isolated-point degree of the target pixel, and a fixed pattern noise correcting section that corrects the pixel value of the target pixel based on the pixel values of the surrounding pixels according to the magnitude of the isolated-point degree.

An image pickup apparatus according to an aspect of the present invention includes the image processing device and an image pickup section that picks up and acquires an image, wherein the image processing device processes the image acquired by the image pickup section.

An image processing method according to an aspect of the present invention includes a shooting scene determining step of determining whether the shooting scene of an acquired image is a low correlation scene containing an object as an isolated point at which correlativities between a target pixel and surrounding pixels positioned in proximity to the target pixel are low, a correlation evaluation value calculating step of calculating a plurality of correlation evaluation values representing correlativities between the target pixel and the plurality of surrounding pixels in the image, respectively, a weight setting step of setting, when the shooting scene of the image is the low correlation scene, heavier weights to the correlation evaluation values calculated from the surrounding pixels having high correlativities with the target pixel than when the shooting scene is not the low correlation scene, an isolated-point degree calculating step of subjecting the plurality of correlation evaluation values calculated in the correlation evaluation value calculating step to weight addition according to the weights to calculate the isolated-point degree of the target pixel, and a fixed pattern noise correcting step of correcting the pixel value of the target pixel based on the pixel values of the surrounding pixels according to the magnitude of the isolated-point degree.

BRIEF DESCRIPTION OF THE DRAWINGS

FIG. 10 is a diagram illustrating an example of surrounding pixels in the case where a target pixel is a G pixel in the embodiment 1;

FIG. 11 is a diagram illustrating an example of surrounding pixels in the case where the target pixel is an R pixel in the embodiment 1;

FIG. 14 is a diagram illustrating an example of the pixel values of the target pixel and neighboring same colored surrounding pixels in the embodiment 1; and FIG. 15 is a diagram illustrating another example of the pixel values of the target pixel and the neighboring same colored surrounding pixels in the embodiment 1.

DETAILED DESCRIPTION OF THE PREFERRED EMBODIMENTS

An embodiment of the present invention will be described below with reference to the drawings.

Embodiment 1

Figure 1:
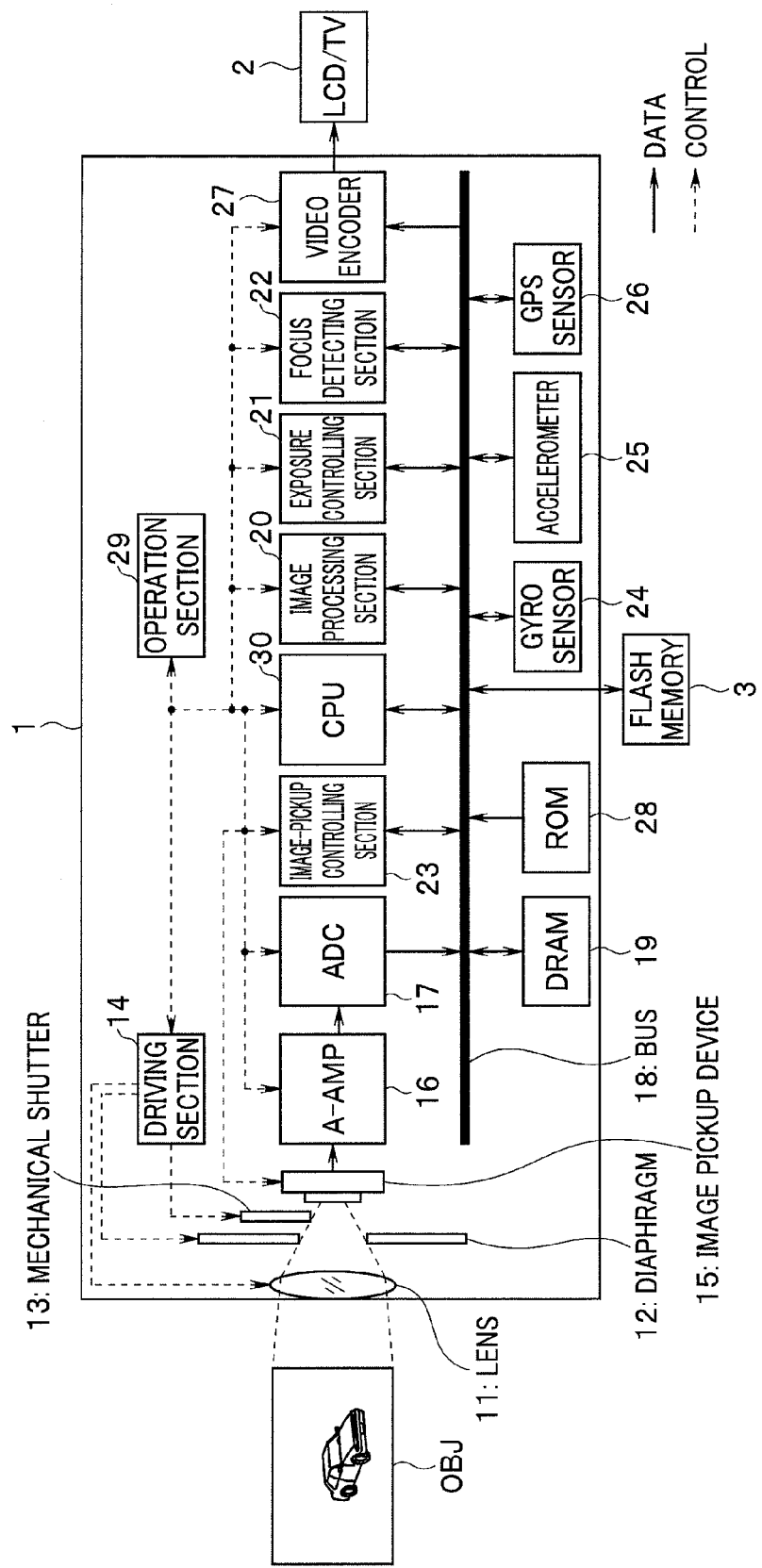
FIG. 1 is a block diagram illustrating the configuration of an image pickup apparatus to which an image processing device is applied in an embodiment 1 of the present invention.

FIG. 1 to FIG. 15 are diagrams illustrating an embodiment 1 of the present invention, where FIG. 1 is a block diagram illustrating the configuration of an image pickup apparatus 1 to which an image processing device is applied.

The present embodiment is an embodiment where the image processing device is applied to the image pickup apparatus 1.

The image pickup apparatus 1 includes a lens 11, a diaphragm 12, a mechanical shutter 13, a driving section 14, an image pickup device 15, an A-AMP 16, an ADC 17, a bus 18, a DRAM 19, an image processing section 20, an exposure controlling section 21, a focus detecting section 22, an image-pickup controlling section 23, a gyro sensor 24, an accelerometer 25, a GPS sensor 26, a video encoder 27, a ROM 28, an operation section 29, and a CPU 30.

The lens 11 is a shooting optical system including a focus lens for forming the optical image of an object OBJ on the image pickup device 15, and is configured to be able to adjust the focus position thereof. Here, it is assumed that the lens 11 is also a zoom lens that is variable in focal distance thereof.

The diaphragm 12 is for controlling the brightness and the amount of blur of the object image that is formed by lens 11 by regulating the passing range of shooting beams.

The mechanical shutter 13, disposed between the lens 11 and the image pickup device 15, is for controlling an exposure by restricting the passing time period of beams that reach image pickup device 15.

The driving section 14 is for drive controlling the lens 11, the diaphragm 12, and the mechanical shutter 13. That is, the driving section 14 drives the focus lens of the lens 11 to perform focus adjustment, drives the diaphragm 12 to adjust a diaphragm opening diameter, and drives the mechanical shutter 13 to perform an opening action and a closing action.

The image pickup device 15 is for generating electrical image signals by subjecting the optical image formed through the intermediary of the lens 11 to photoelectric conversion. The image pickup device 15 is configured as, for example, a single-plate color image pickup device including a primary color Bayer array color filter, which generates an image in which only one of RGB color components is obtained for each pixel.

The A-AMP 16 is an analog amplifier that amplifies analog image signals outputted from the image pickup device 15.

The ADC 17 is for converting the analog image signals amplified by the A-AMP 16 into digital image signals (hereafter, referred to as image data as needed). The image data that is converted here (called RAW image data or the like) is saved in the DRAM 19.

Note that the lens 11, the diaphragm 12, the mechanical shutter 13, the driving section 14, the image pickup device 15, the A-AMP 16, and the ADC 17 configure an image pickup section that picks up and acquires images in the image pickup apparatus 1. Accordingly, the image processing device applied to the image pickup apparatus 1 is for processing images acquired by the image pickup section.

The bus 18 is a transfer route through which instructions, data, and the like are transferred from one portion to the other portions in the image pickup apparatus 1. Now, in the example illustrated in FIG. 1, the bus 18 connects the ADC 17, the DRAM 19, the image processing section 20, the exposure controlling section 21, the focus detecting section 22, the image-pickup controlling section 23, the gyro sensor 24, the accelerometer 25, the GPS sensor 26, the video encoder 27, the ROM 28, and the CPU 30.

The DRAM 19 is a storage section in which image data under processing, various kinds of data, and the like are temporarily stored. Various kinds of data used for the determination of a shooting scene, which will be described hereafter, are stored in the DRAM 19.

The image processing section 20 reads the image data from the DRAM 19, while reading various kinds of data as needed, to subject the image data to image processing to be described hereafter (e.g., image processing for displaying or image processing for recording). The content of the processing will be described later in greater detail with reference to FIG. 2, FIG. 6 and the like. The image data to be displayed or the image data to be recorded that has been here subjected to image processing by the image processing section 20 is saved again in the DRAM 19. Here, the image data to be displayed is processed by the video encoder 27 to be described hereafter, and displayed on a LCD/TV2. The LCD/TV2 may be either one incorporated in the image pickup apparatus 1 or one connected to the outside of the image pickup apparatus 1. The image data to be recorded is recorded in a recording medium such as a flash memory 3. The flash memory 3 may be either one incorporated in the image pickup apparatus 1 or a memory card or the like detachable from the image pickup apparatus 1.

The exposure controlling section 21 reads the image data from the DRAM 19 and calculates appropriate exposure conditions, that is, a shutter speed, an ISO speed, and an f-number. The exposure conditions calculated here are saved in the DRAM 19 and used for a control by the image-pickup controlling section 23 and used in the image processing via the CPU 30 and the like.

The focus detecting section 22 reads the image data from the DRAM 19 and detects a focus position corresponding to a distance to the object using, for example, contrast AF to create focus information. The focus information created here is saved in the DRAM 19.

The image-pickup controlling section 23 is for controlling the scanning method and the like of the image pickup device 15.

The gyro sensor 24 detects and outputs the angular velocity of the image pickup apparatus 1. The angular velocity outputted here is saved in the DRAM 19.

The accelerometer 25 detects and outputs the acceleration of the image pickup apparatus 1. The acceleration outputted here is saved in the DRAM 19.

The GPS sensor 26 outputs information on latitude/longitude (GPS information) representing the current position of the image pickup apparatus 1. The GPS information outputted here as positional information on the shooting of an image is saved in the DRAM 19.

The video encoder 27 is for reading the image data to be displayed from the DRAM 19 and generating and outputting image signals for displaying. The image signals outputted from the video encoder 27 is displayed on the LCD/TV2, as described above.

The ROM 28 is for storing various processing programs and set values necessary for the actions of the image pickup apparatus 1 in a nonvolatile manner, and is configured as, for example, a programmable or rewritable memory.

The operation section 29 is a user interface for operation input to the image pickup apparatus 1, and includes a power button for turning on/off the power supply of the image pickup apparatus 1, a shooting button for instructing the start of shooting, a mode setting button for setting shooting modes such as a manual shooting mode, a setting button for setting a shutter speed, an f-number, and an ISO speed in the manual shooting mode, a setting button for setting a fixed pattern noise (FPN) correction intensity, a time setting button for setting a time, and the other various setting buttons.

The CPU 30 is a controlling section for controlling individual sections in the image pickup apparatus 1 in an integrated manner. For example, the CPU 30 transmits an instruction to the driving section 14 such that the lens 11 is driven to a focus position detected by the focus detecting section 22. In addition, the CPU 30 transmits an instruction to the driving section 14 such that the diaphragm 12 is driven to have an f-number calculated by the exposure controlling section 21. Furthermore, the CPU 30 transmits an instruction to at least one of the driving section 14 and the image-pickup controlling section 23 such that an exposure is made at a shutter speed calculated by the exposure controlling section 21 (here, when the exposure time is controlled by the mechanical shutter 13, the instruction is transmitted to the driving section 14, and when controlled by a so-called device shutter of the image pickup device 15, the instruction is transmitted to the image-pickup controlling section 23). Additionally, the CPU 30 transmits an instruction to the A-AMP 16 such that amplification is made at an ISO speed calculated by the exposure controlling section 21. The CPU 30 saves a piece of shooting setting information that are set to each section (e.g., the focal distance (zooming position) of the lens 11, the f-number, the shutter speed, the ISO speed, the focus information, and pieces of menu information on user operations inputted from the operation section 29 (e.g., a set value of the FPN correction intensity)) in the DRAM 19. Note that pieces of information out of the pieces of menu information set by the user that need to be stored when the power supply is turned off, are further saved in the ROM 28 and the like. In addition, the CPU 30 reads the acceleration/angular velocity stored in the DRAM 19, calculates the amount of shake of the image pickup apparatus 1, and saves the calculated amount of shake in the DRAM 19. Furthermore, the CPU 30 saves the shooting time point of a still picture in the DRAM 19.

Figure 2:
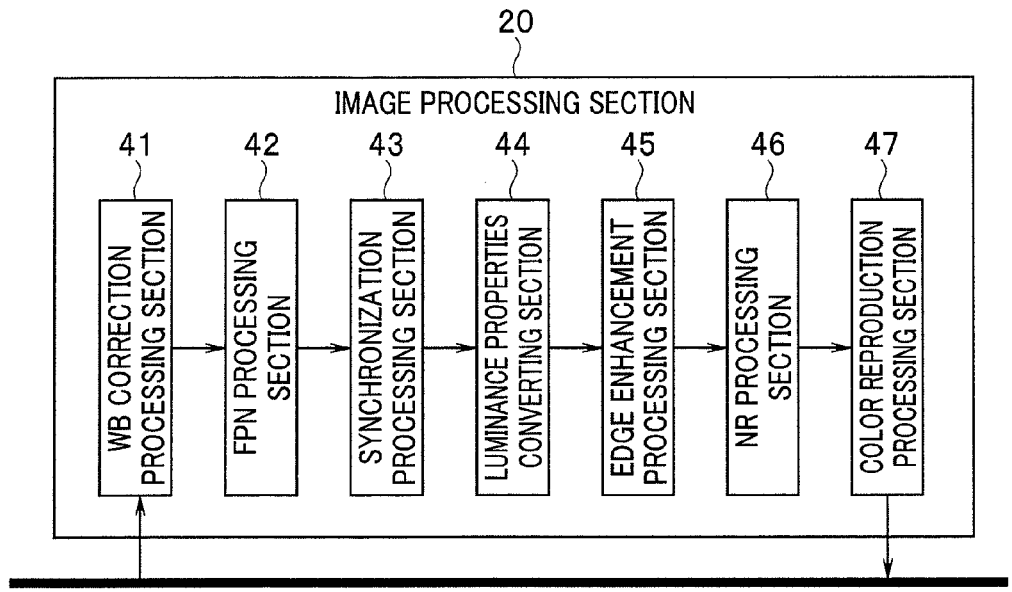
FIG. 2 is a block diagram illustrating the configuration of an image processing section in the embodiment 1.

Next, FIG. 2 is a block diagram illustrating the configuration of the image processing section 20.

The image processing section 20 includes a white balance (WB) correction processing section 41, a fixed pattern noise (FPN) processing section 42, a synchronization processing section 43, a luminance properties converting section 44, an edge enhancement processing section 45, a noise reduction (NR) processing section 46, and a color reproduction processing section 47.

The WB correction processing section 41 corrects the color balance among individual RGB components of an image such that a white object looks white.

The FPN processing section 42 performs, as will be described later in detail, FPN processing of removing (or reducing) fixed pattern noise existing in an image as isolated points.

The synchronization processing section 43 performs processing of, with respect to RAW image data in a Bayer array in which only one of RGB components is obtained for each pixel, obtaining color components absent in a target pixel from surrounding pixels by interpolation to generate image data in which three RGB color components are completed for each pixel.

The luminance properties converting section 44 performs gradation conversion on the luminance components of an image.

The edge enhancement processing section 45 performs edge enhancement by extracting edge components in an image, multiplying the extracted edge components by an edge enhancement coefficient, and adding the multiplied edge components to the original image.

The NR processing section 46 performs noise reduction processing by performing coring processing according to frequency, or the like on image data. This reduces random noise or periodic noise that exists even after the fixed pattern noise removal by the FPN processing section 42.

The color reproduction processing section 47 performs color reproduction on an image.

Figure 3:
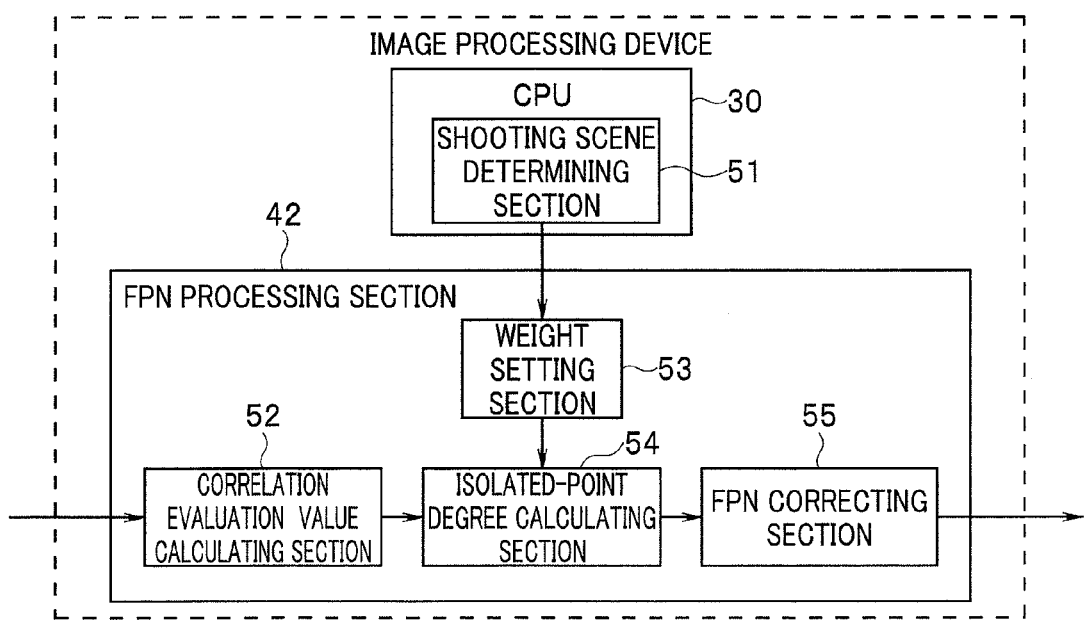
FIG. 3 is a block diagram illustrating in detail the configurations of a CPU and an FPN processing section in the embodiment 1.

Subsequently, FIG. 3 is a block diagram illustrating the configurations of the CPU 30 and the FPN processing section 42 in detail.

The CPU 30 includes a shooting scene determining section 51, and the FPN processing section 42 includes a correlation evaluation value calculating section 52, a weight setting section 53, an isolated-point degree calculating section 54, and a fixed pattern noise (FPN) correcting section 55. Note that the configurations are not intended to limit the configurations of the CPU 30 and the FPN processing section 42, and for example a configuration in which the shooting scene determining section 51 is provided in the FPN processing section 42 may be adopted.

The shooting scene determining section 51 infers, as will be described later in detail with reference to FIG. 5, the shooting scene of an image based on various kinds of information acquired by the image pickup apparatus 1 to determine whether the shooting scene of the acquired image is a low correlation scene. Here, the low correlation scene is a shooting scene that includes an object as an isolated point at which correlativity between a target pixel and surrounding pixels positioned in proximity to the target pixel is low (e.g., an object, being a point image object having high luminance, subject to false recognition to be an FPN). A specific example of the low correlation scene includes a starry sky shooting scene in which stars in a night sky is shot, a night view shooting scene in which point-like light sources exist, and the like. Such shooting scenes are also scene including dark parts that readily make FPNs conspicuous.

The correlation evaluation value calculating section 52 calculates a plurality of correlation evaluation values each representing the correlativity between a target pixel and a plurality of surrounding pixels in proximity to the target pixel.

The weight setting section 53 sets heavier weights to the correlation evaluation values calculated from the surrounding pixels having high correlativities with the target pixel when the shooting scene of an image is the low correlation scene (e.g., the starry sky shooting scene or the night view shooting scene), than not in the low correlation scene (in a normal shooting scene to be described hereafter).

The isolated-point degree calculating section 54 calculates the isolated-point degree of the target pixel by performing weight addition on the plurality of correlation evaluation values calculated by the correlation evaluation value calculating section 52, based on the weights set by the weight setting section 53.

The FPN correcting section 55 corrects the pixel value of the target pixel according to the magnitude of the isolated-point degree of the target pixel based on the pixel values of the surrounding pixels.

The image processing device applied to the image pickup apparatus 1 includes the above-described shooting scene determining section 51, the correlation evaluation value calculating section 52, the weight setting section 53, the isolated-point degree calculating section 54, and the FPN correcting section 55, but is not limited to those sections, and may further includes the whole CPU 30 or the whole image processing section 20, or the DRAM 19, the ROM 28, the operation section 29, or the like.

Figure 4:
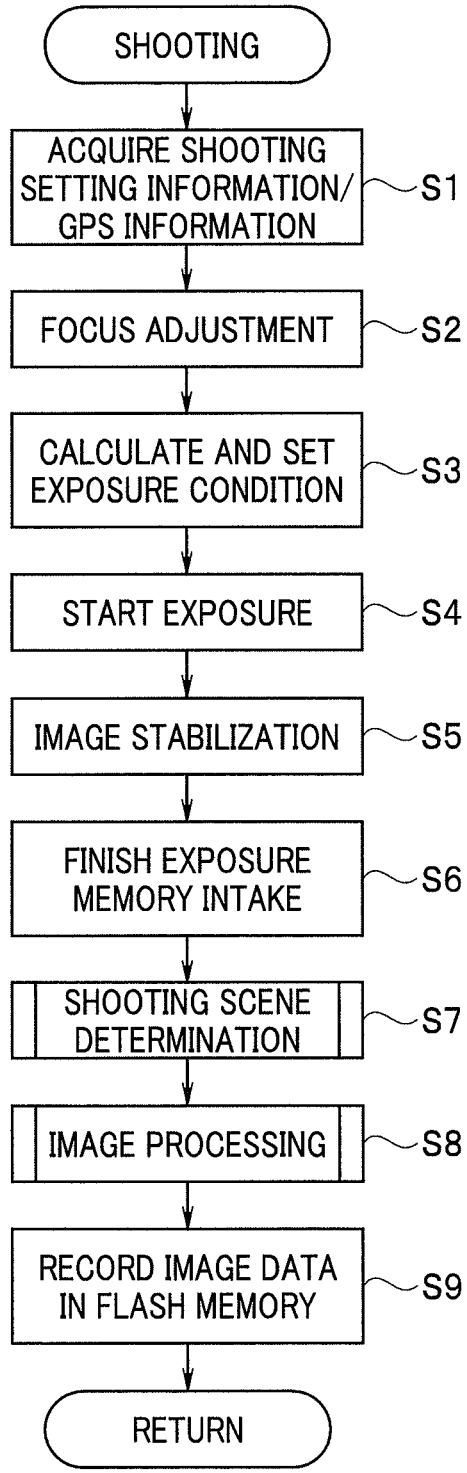
FIG. 4 is a flowchart illustrating shooting processing in the image pickup apparatus in the embodiment 1.

FIG. 4 is a flowchart illustrating shooting processing in the image pickup apparatus 1.

For example, when the processing for shooting a still picture is entered from the main processing (not illustrated) of the image pickup apparatus 1 in the state of performing live view with the mechanical shutter 13 opened, shooting setting information or GPS information is first acquired and stored in the DRAM 19 (step S1). The shooting setting information acquired here includes, for example, the focal distance (zooming position) of the lens 11, an f-number, a shutter speed, an ISO speed, and menu information. The pieces of information stored in the DRAM 19 here are to be used later in the image processing.

Next, the driving section 14 drives a focus lens in the lens 11 to perform the focus adjustment (step S2). The focus information on the lens 11 set by the focus adjustment is stored in the DRAM 19 and is to be used later in the image processing.

Subsequently, based on the image acquired in the live view, the exposure controlling section 21 calculates and sets exposure conditions (step S3). The exposure conditions calculated here, that is, a shutter speed, an ISO speed, and an f-number are stored in the DRAM 19, and is to be used later in the image processing.

Then, by once closing and opening the mechanical shutter 13, or by finishing pixel reset of the image pickup device 15, the exposure of an image is started (step S4).

At the same time as the start of the exposure, or from a time point slightly before the start of the exposure, image stabilization is performed (step S5). The image stabilization is performed by performing movement distance calculating arithmetic or the like based on the angular velocity detected by the gyro sensor 24 and the acceleration detected by the accelerometer 25 to calculate the amount of shake of the image pickup apparatus (so-called the amount of camera shake), and moving for example at least one of the lens 11 and the image pickup device 15 so as to offset the calculated amount of shake. Note that the calculation is not limited to the method and may be made by the other image stabilization method. The amount of shake in shooting the image that is calculated here is stored in the DRAM 19 and is to be used later in the image processing.

When an exposure time determined from the shutter speed elapses from the time point at which the exposure is started in step S4, the exposure is finished by closing the mechanical shutter 13, or transferring electric charges of respective pixels of the image pickup device 15 from photodiodes to a memory in the image pickup device 15. Furthermore, when the exposure is finished, image signals are read out from the image pickup device 15, processed by the A-AMP 16 and the ADC 17, and thereafter stored in the DRAM 19 (step S6).

The shooting scene determining section 51 of the CPU 30 performs shooting scene determination processing, which will be described hereafter with reference to FIG. 5, based on the shooting setting information, the GPS information, or the like acquired in step S1 (step S7).

The image processing section 20 then performs the image processing, which will be described hereafter with reference to FIG. 6 (step S8).

Thereafter, image data processed for recording by the image processing section 20 is recorded in the flash memory 3 and image data processed for displaying by the image processing section 20 is displayed in the LCD/TV2 (step S9), and then the flow returns from the processing to the main processing (not illustrated).

Figure 5:
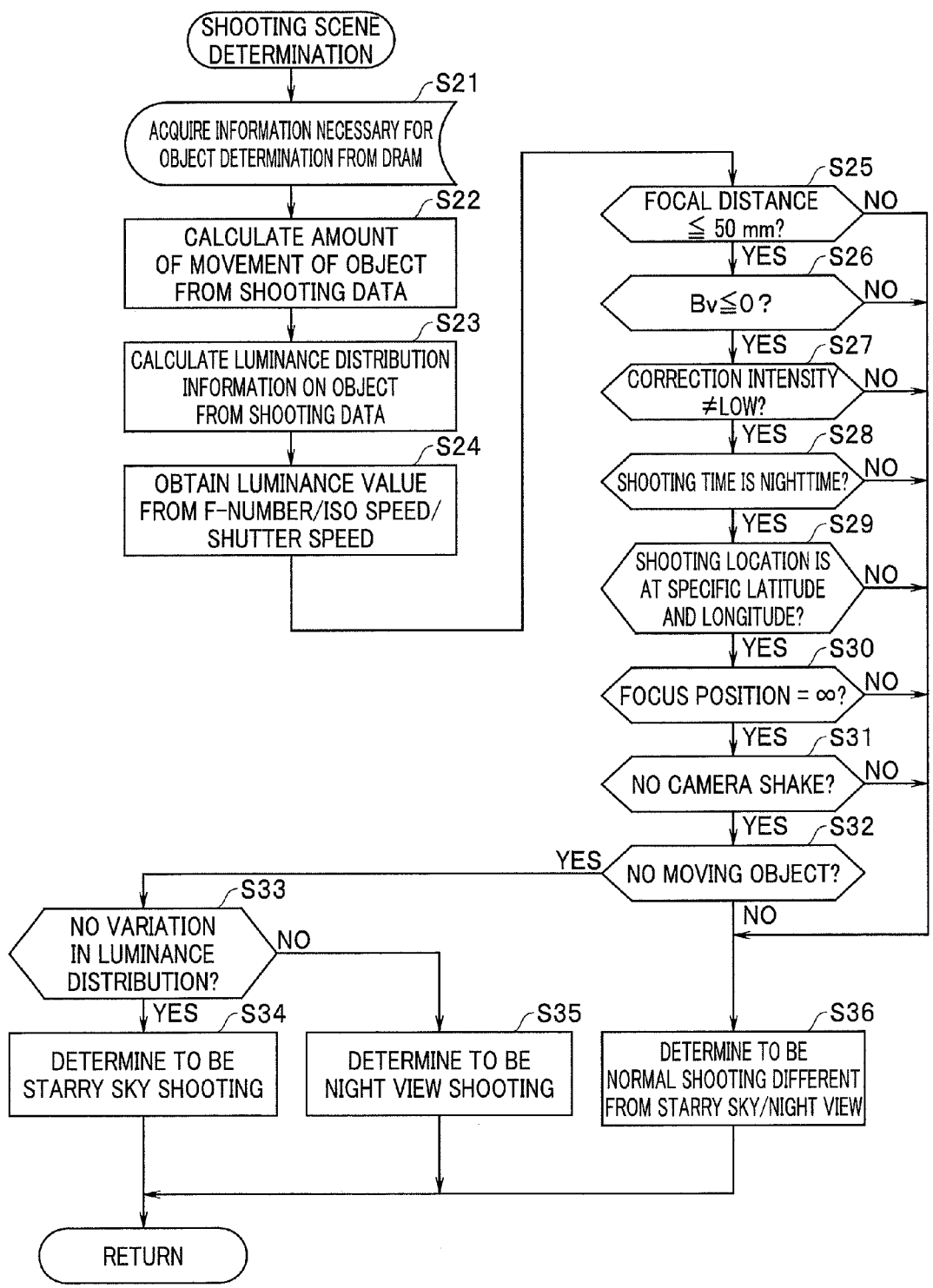
FIG. 5 is a flowchart illustrating in detail the processing of shooting scene determination in step S7 of FIG. 4 in the embodiment 1.

FIG. 5 is a flowchart illustrating in detail the shooting scene determination processing in step S7 of FIG. 4.

When the processing is started, the shooting scene determining section 51 acquires information necessary for object determination from the DRAM 19 (step S21).

Then, the amount of movement of an object in the image is calculated from a plurality of shooting data items including images acquired in the live view that differ in shooting time point (step S22). The amount of movement of the object is obtained by the image processing section 20 or the like with, for example, motion vector calculating method using known block matching or the like. The obtained amount of movement of the object is stored in the DRAM 19 under the control of the CPU 30.

In addition, luminance distribution information (e.g., a luminance histogram) on the image is calculated from shooting data acquired as a still picture (step S23). The calculated luminance distribution information is stored in the DRAM 19 under the control of the CPU 30.

Based on the f-number, the ISO speed, and the shutter speed, a luminance value Bv of the image is obtained by, for example, an arithmetic expression of the APEX system (step S24). The obtained luminance value Bv is stored in the DRAM 19 under the control of the CPU 30. Note that although the luminance value of the image is obtained here by the APEX (Additive Photographic Exposure) system, but may be obtained not only by the APEX system but also by other known calculating methods, for example, the average value of the luminance values of all pixels, or the average value of the pixel values of full-luminance equivalent pixels (e.g., G pixels).

Next, it is determined whether the focal distance (zooming position) of the lens 11 at the time of acquiring the still picture is, for example, 50 mm or less in terms of so-called 35 mm film format (step S25). Here, a 50 mm lens in terms of 35 mm film format is called a standard lens.

If it is determined here that the focal distance is 50 mm or less, it is determined whether the luminance value Bv calculated in step S24 is zero or less (step S26).

If it is determined here that the luminance value Bv is zero or less, a set value of a FPN correction intensity is read from the DRAM 19 and it is determined whether or not a correction intensity is low (step S27).

If it is determined here that the correction intensity is not low, the shooting time point of the still picture is read from the DRAM 19 and it is determined whether the shooting time point is in the nighttime (step S28). Here the determination of the nighttime may be made using means that determines fixed time period, for example, from 6 p.m. to 6 a.m. as the nighttime, and it is better to take into consideration the fact that the time period of the nighttime differs according to seasons, or latitude and longitude, and make more accurate determination of nighttime based on the pieces of information.

If it is determined here that the shooting time point is in the nighttime, it is determined whether the latitude and the longitude of a shooting location represented by the GPS information read from the GPS sensor match a specific latitude and longitude (step S29). Now, for example, there are locations known for being especially suitable for shooting stars. It is therefore determined here whether the shooting location corresponds to such a specific location.

If it is determined here that the shooting location is identical to the specific latitude and the longitude, it is determined whether the focus position is infinity based on the focus information acquired from the DRAM 19 (step S30).

If it is determined here that the focus position is infinity, the amount of shake of the image pickup apparatus 1 is read from the DRAM 19, and the read amount of shake is compared with a predetermined threshold value to determine whether any camera shake occurs, that is, whether the image pickup apparatus 1 is held by a hand or for example fixed to a tripod in the shooting (step S31).

If it is determined here that no camera shake occurs, it is determined whether there are any object moving in the image, from the amount of movement of the object calculated in step S22 (step S32).

If it is determined here that there is no moving object, the results of steps S25 to S32 is integrated to determine that the shooting scene is a shooting scene having a higher degree of being the low correlation scene than a predetermined threshold degree, that is, the low correlation scene including an object as an isolated point at which correlativity between a target pixel and surrounding pixels positioned in proximity to the target pixel is low. It is then determined whether a variation of the luminance distribution calculated in step S23 is equal to or wider than a predetermined variation, that is, whether the luminance distribution is roughly divided into, for example, dark objects and light objects (step S33). The variation is determined based on, for example, the variance and the standard deviation of the luminance distribution.

If it is determined here that the variation of the luminance distribution is equal to or wider than the predetermined variation, the shooting scene is determined as starry sky shooting (step S34).

Alternately, if it is determined in step S33 that the variation of the luminance distribution is smaller than the predetermined variation, the shooting scene is determined to be night view shooting (step S35). The night view shooting scene is a shooting scene having a degree of being the low correlation scene higher than the predetermined threshold degree but lower than the starry sky shooting scene. As seen from the above, the shooting scene determining section 51 also determines the degree at which the shooting scene of an image is the low correlation scene, and the determination is made based on the variation of the luminance distribution. Note that the determination of the degree of being the low correlation scene may be of course made by methods other that the method using the variation of the luminance distribution.

The shooting scene is determined to be neither the starry sky nor the night view, but normal shooting (step S36) if the determination turns out NO in any one of steps S25 to S32, that is, if the focal distance is determined to be greater than 50 mm in step S25, if the luminance value Bv is determined to be greater than zero in step S26, if the correction intensity is determined to be low in step S27, if the shooting time is determined not to be in the nighttime in step S28, if the shooting location is determined not to match at the specific latitude and the longitude in step S29 (that is, if it is determined that at least one of not matching the specific latitude and not matching the specific longitude is satisfied), if the focus position is determined not to be infinity in step S30, if the camera shake is determined to occur in step S31, and if the moving object is determined to exist in step S32. The normal shooting scene is, as described above, a shooting scene not being the low correlation scene.

After the determination of the shooting scene in such a manner in any one of steps S34 to S36, the flow returns from the processing to the processing illustrated in FIG. 4.

Note that the determination branches comparing the individual values used for the determination with the predetermined threshold values in the example illustrated in FIG. 5, but the determination may be made by calculating the degree of confidence of the respective determination elements based on the respective values.

In addition, the processing of the shooting scene determination illustrated in FIG. 5 is merely an example of the determining method, and the other determining methods and the like can be widely applied without being limited to the determining method.

Figure 6:
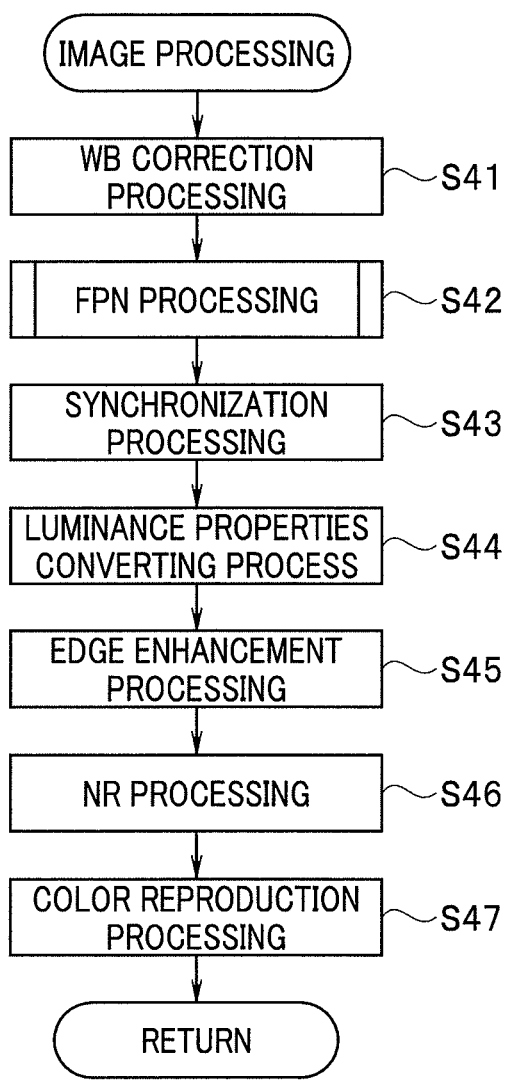
FIG. 6 is a flowchart illustrating in detail image processing in step S8 of FIG. 4 in the embodiment 1.

FIG. 6 is a flowchart illustrating in detail the image processing in step S8 of FIG. 4.

When the processing is started, the WB correction processing section 41 performs white balance correction processing (step S41).

Next, the FPN processing section 42 performs, as will be described later with reference to FIG. 7 or FIG. 8, FPN processing of removing or reducing fixed pattern noise that exists in the image as isolated points (step S42).

Subsequently, the synchronization processing section 43 performs synchronization processing (step S43), the luminance properties converting section 44 performs the gradation conversion of the luminance components on the image (step S44), the edge enhancement processing section 45 performs the edge enhancement (step S45), the NR processing section 46 performs the noise reduction processing (step S46), the color reproduction processing section 47 performs the color reproduction processing on the image (step S47), and the flow returns from the processing to the processing illustrated in FIG. 4.

Figure 7:
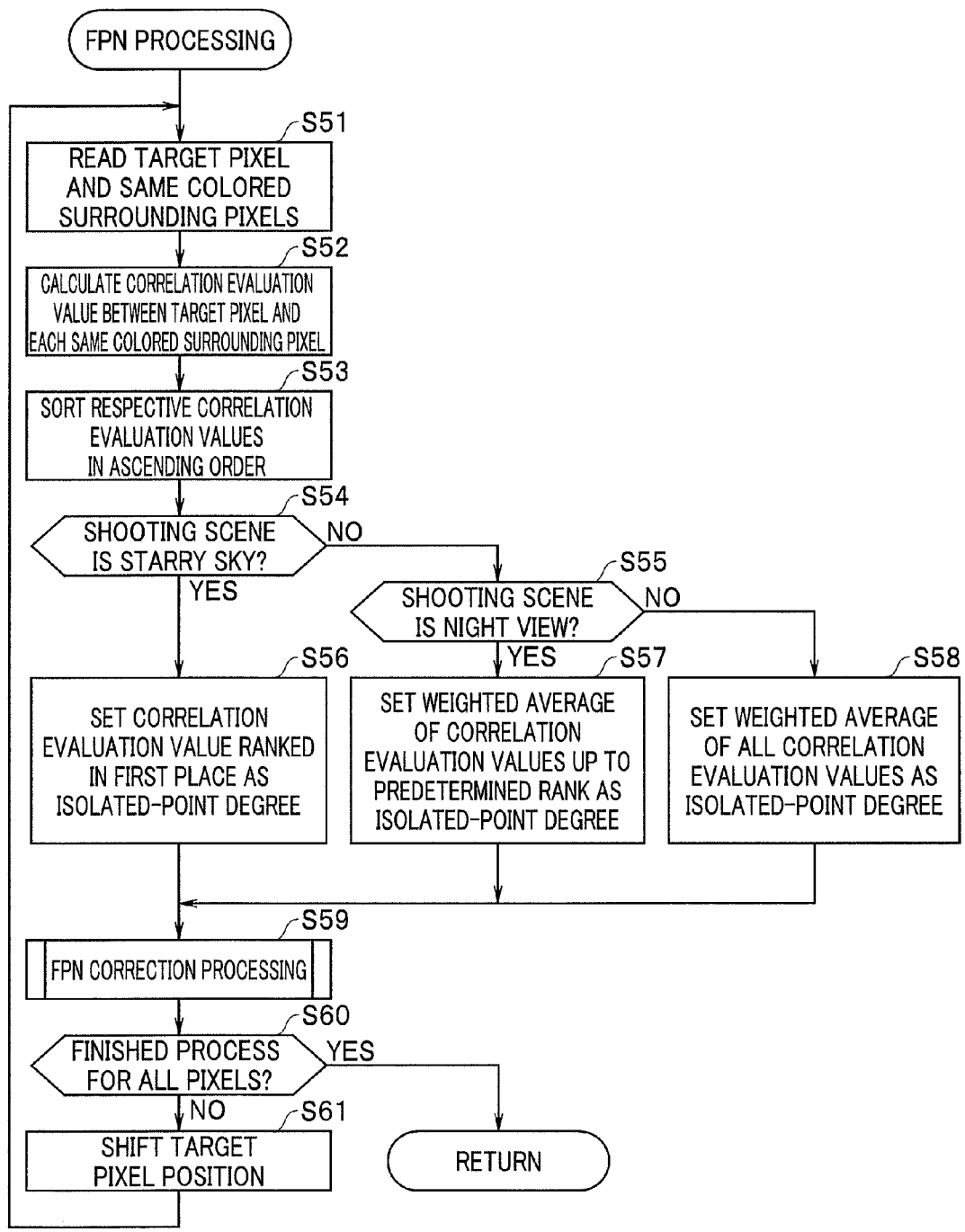
FIG. 7 is a flowchart illustrating in detail FPN processing in step S42 of FIG. 6 in the embodiment 1.

FIG. 7 is a flowchart illustrating in detail the FPN processing in step S42 of FIG. 6.

When the processing is started, the FPN processing section 42 sets a given pixel in the image data as a target pixel, and reads the pixel value of the target pixel and the pixel values of a plurality of same colored surrounding pixels in proximity to the target pixel (step S51).

Figures 12, 13:
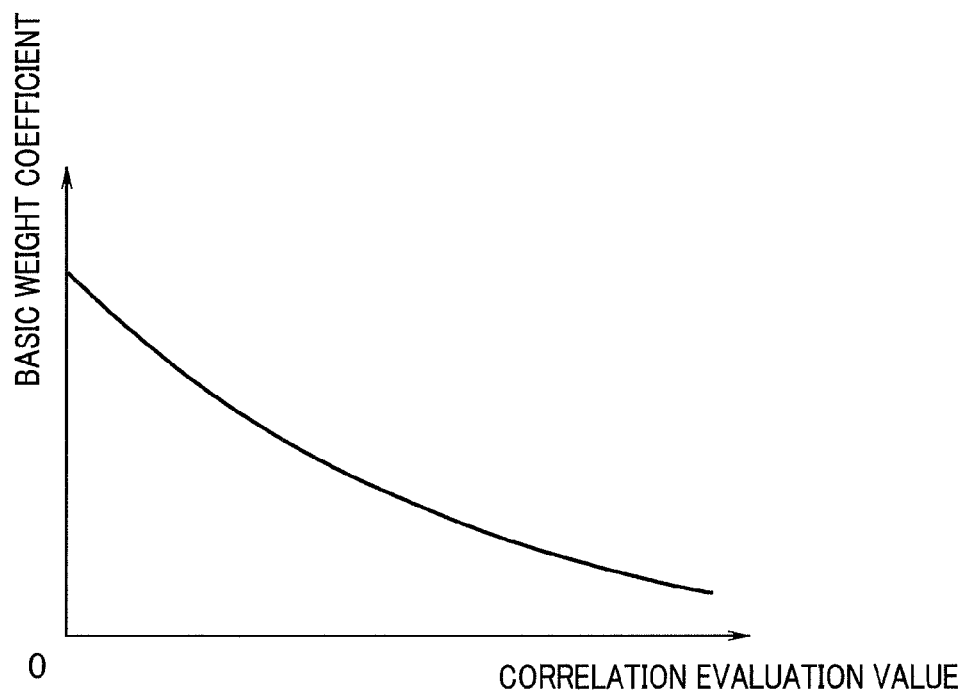
FIG. 12 is a diagram illustrating an example of surrounding pixels in the case where the target pixel is a B pixel in the embodiment 1.
FIG. 13 is a graph illustrating the relationship between a correlation evaluation value and a basic weight coefficient KB in the embodiment 1.

Here, FIG. 10 is a diagram illustrating an example of the surrounding pixels where the target pixel is a G pixel, FIG. 11 is a diagram illustrating an example of the surrounding pixels where the target pixel is an R pixel, and FIG. 12 is a diagram illustrating an example of the surrounding pixels where the target pixel is a B pixel.

In the examples illustrated in FIG. 10 to FIG. 12, whichever a target pixel C is the G pixel, the R pixel, or the B pixel, eight pixels positioned in the vicinity thereof (here, G1 to G8, R1 to R8, or B1 to B8) are set as the surrounding pixels (note that the number of surrounding pixels is of course not limited to eight, and the number of surrounding pixels can be written more widely as imax (imax is an integer more than zero)).

The following description will be made taking an example in which the number of surrounding pixels is eight, and the target pixel C is the G pixel, as illustrated in FIG. 10.

Next, the correlation evaluation value calculating section 52 calculates correlation evaluation values between the target pixel C and the surrounding pixels G1 to G8 (step S52). As a specific example, the correlation evaluation value calculating section 52 calculates for example absolute difference values between the pixel value of the target pixel C and the pixel values of the surrounding pixels G1 to G8, as correlation evaluation values REG1 to REG8 (the correlation evaluation value calculating section 52 therefore calculates the correlation evaluation values based on the four basic operations of arithmetic (addition, subtraction, multiplication, and division) (here, calculating an absolute value is multiplying a negative value by (−1), and thus included in the four basic operations of arithmetic), and using an arithmetic method suitable for computer processing) (note that the correlation evaluation values are not limited to absolute difference values and a wide variety of values can be adopted as long as the values vary with the correlativities between the target pixel C and the surrounding pixels). Assume that the correlation evaluation values REG1 to REG8 are calculated here as, for example, values shown by the following Expression 1.

$REG1=|C-G1|=30$ $REG2=|C-G2|=5$ $REG3=|C-G3|=80$ $REG4=|C-G4|=7$ $REG5=|C-G5|=120$ $REG6=|C-G6|=90$ $REG7=|C-G7|=80$ $REG8=|C-G8|=70$ [Expression 1]

The correlation evaluation value calculating section 52 further sorts the eight calculated correlation evaluation values REG1 to REG8 in ascending order (i.e., in descending order of correlativity) into RE1 to RE8 as shown by the following Expression 2 (step S53).

$RE1=REG2=|C-G2|=5$ $RE2=REG4=|C-G4|=7$ $RE3=REG1=|C-G1|=30$ $RE4=REG8=|C-G8|=70$ $RE5=REG3=|C-G3|=80$ $RE6=REG7=|C-G7|=80$ $RE7=REG6=|C-G6|=90$ $RE8=REG5=|C-G5|=120$ [Expression 2]

Next, it is determined whether the result obtained by the shooting scene determination illustrated in FIG. 5 indicates the starry sky shooting scene having a high degree of being the low correlation scene (step S54).

If it is determined in this step S54 that the shooting scene is not the starry sky shooting scene, it is determined whether the shooting scene is the night view shooting scene, which is also the low correlation scene but the degree thereof is lower than that of the starry sky shooting scene (step S55).

If it is determined in step S54 that the shooting scene is the starry sky shooting scene, as shown by the following Expression 3, the correlation evaluation value RE1 ranked in the first place in the sorted order (i.e., having the highest correlativity) is set as an isolated-point degree IP of the target pixel C (step S56).

$IP=RE1=5$ [Expression 3]

In addition, if it is determined in step S55 that the shooting scene is the night view shooting scene, the weighted average of the correlation evaluation values RE1 to REi ranked in the first to a predetermined i-th places in the sorted order (i.e., from the highest correlativity to the predetermined i-th highest correlativity) is set as the isolated-point degree IP of the target pixel C (step S57). Note that i<imax, and it is assumed for example that i=3, that is, the weighted average of the correlation evaluation values ranked in the first to the third places is set as the isolated-point degree IP.

Here, a weight coefficient K is set by the weight setting section 53 based on, for example, a basic weight coefficient KB, the value of which becomes small as the correlation evaluation value increases as illustrated in FIG. 13 (represented by a monotone decreasing function), and it is assumed here that K is set as K=KB. Here, FIG. 13 is a graph illustrating the relationship between the correlation evaluation value and the basic weight coefficient KB.

Note that the basic weight coefficient KB is not limited to ones, the values of which become small asymptotically as the correlation evaluation value increases, but for example, may be set in such a manner that the value thereof becomes small stepwise (represented by a step-like monotone decreasing function).

Note that the absolute difference value is used here as the correlation evaluation value, and the basic weight coefficient KB is set in such a manner that the value thereof becomes small as the correlation evaluation value increases (i.e., as the correlativity decreases) so as to represent a higher correlativity as the value becomes small. However, when the reciprocal of absolute difference value is for example used as the correlation evaluation value, of course the basic weight coefficient KB is set in this case in such a manner that the value thereof becomes small as the correlation evaluation value decreases so as to represent a higher correlativity as the value becomes great. In short, the basic weight coefficient KB is set to be high as the correlativity becomes high.

As a specific example, when a predetermined ratio for the width of gradation (dynamic range) is denoted by Dx, it is assumed here that the basic weight coefficients KB(REi) corresponding to the correlation evaluation values REi (i=1 to imax) (imax=8 in the example), respectively, are set as follows.

That is, for an integer n of zero or more that satisfies the following Expression 4, $n \times Dx \leq REi \leq (n+1) \times Dx$ ($n=0$)

$n \times Dx < REi \leq (n+1) \times Dx$ ($n=1$ or more) [Expression 4]

the basic weight coefficients KB(REi) are set by Expression 5.

$KB(REi)=1/(n+1)$ [Expression 5]

More specifically, assuming for example that Dx is 10, which is 1/25 of an 8-bit width of gradation (256 levels: 0 to 255), in order to satisfy the following,

| n | Range of REi | Value of KB |
|---|---|---|
| 0 | 0 to 10 | 1/1 = 1.00 |
| 1 | 10 to 20 | 1/2 = 0.50 |
| 2 | 20 to 30 | 1/3 = 0.33 |
| 3 | 30 to 40 | 1/4 = 0.25 |
| 4 | 40 to 50 | 1/5 = 0.20 |
| 5 | 50 to 60 | 1/6 = 0.17 |
| 6 | 60 to 70 | 1/7 = 0.14 |
| 7 | 70 to 80 | 1/8 = 0.13 |
| 8 | 80 to 90 | 1/9 = 0.11 |
| ... | ... | ... |
| 11 | 110 to 120 | 1/12 = 0.08 |
| ... | ... | ... | the basic weight coefficients KB are set as shown by the following Expression 6.

$$KB(RE1=5)=1.00$$
$$KB(RE2=7)=1.00$$
$$KB(RE3=30)=0.33$$
$$KB(RE4=70)=0.14$$
$$KB(RE5=80)=0.13$$
$$KB(RE6=80)=0.13$$
$$KB(RE7=90)=0.11$$
$$KB(RE8=120)=0.08 \quad \text{[Expression 6]}$$

As described above, to set the weight coefficients K to be equal to the basic weight coefficients KB, the weight coefficients K(i) corresponding to the correlation evaluation values REi ranked in the i-th places (i=1 to 8) in the sorted order are here defined as shown by the following Expression 7.

$$K(i)=KB(REi) \quad \text{[Expression 7]}$$

For example, using such weight coefficients K(i), the isolated-point degree IP is calculated by the isolated-point degree calculating section 54 as shown by the following Expression 8.

$$IP = \frac{\sum_{i=1}^{3} K(i) \times REi}{\sum_{i=1}^{3} K(i)} \quad \text{[Expression 8]}$$

In the case of the specific example shown by Expression 2 and Expression 6, IP=(1.00×5+1.00×7+0.33×30)/(1.00+1.00+0.33)=9.4, that is a value greater than IP=5 of the starry sky shooting scene shown by Expression 3.

In addition, as described above, the isolated-point degree calculating section 54 calculates the isolated-point degree IP based on the four basic operations of arithmetic, using the arithmetic method suitable for the computer processing.

Here, comparing the weights to the correlation evaluation values RE1 to RE3 for calculating the isolated-point degree IP between the starry sky shooting scene and the night view shooting scene, both of which are the low correlation scenes as described above, (Starry Sky Shooting Scene)
RE1: 1.00
RE2: 0
RE3: 0
(Night View Shooting Scene)
RE1: 1.00/(1.00+1.00+0.33)=0.43
RE2: 1.00/(1.00+1.00+0.33)=0.43
RE3: 0.33/(1.00+1.00+0.33)=0.14 it is understood that the weight setting section 53 sets a heavier weight used to calculate the isolated-point degree to a correlation evaluation value calculated from a surrounding pixel having a high correlativity with the target pixel C, according to the degree of being low correlation scene (as described above, the starry sky shooting scene has a higher degree of being the low correlation scene than that of the night view shooting scene). Furthermore, it is also understood that the weight setting section 53 set a heavier weight to a correlation evaluation value that is not intended to be zero, as the correlation evaluation value becomes smaller.

In contrast, if it is determined in step S55 that the shooting scene is not the night view shooting scene, that is, the normal shooting scene, the weighted average of the correlation evaluation values RE1 to REimax ranked in all the places (i.e., from the first to the imax-th places in the sorted order) is set as the isolated-point degree IP of the target pixel C (step S58).

That is, the isolated-point degree calculating section 54 calculates the isolated-point degree IP using the above-described weight coefficients K(i), as shown by the following Expression 9.

$$IP = \frac{\sum_{i=1}^{imax} K(i) \times REi}{\sum_{i=1}^{imax} K(i)} \quad \text{[Expression 9]}$$

In the specific example shown by Expression 2 and Expression 6, the calculation result by Expression 9 is IP=24.7, which is a value greater than IP=5 in the starry sky shooting scene shown by Expression 3, and greater than IP=9.4 in the night view shooting scene using Expression 8.

In the case of the normal shooting, the weights to the correlation evaluation values RE1 to RE8 used to calculate the isolated-point degree IP are calculated as follows, using a denominator=1.00+1.00+0.33+0.14+0.13+0.13+0.11+0.08=2.92,
RE1: 1.00/2.92=0.34
RE2: 1.00/2.92=0.34
RE3: 0.33/2.92=0.11
RE4: 0.14/2.92=0.05
RE5: 0.13/2.92=0.04
RE6: 0.13/2.92=0.04
RE7: 0.11/2.92=0.04
RE8: 0.08/2.92=0.03
and as compared with the cases of the above-described starry sky shooting scene and the night view shooting scene, it is understood that when the shooting scene of an image is the low correlation scene (the starry sky shooting scene or the night view shooting scene), the weight setting section 53 sets a heavier weight than when the shooting scene is not the low correlation scene (the normal shooting scene), to a correlation evaluation value calculated from a surrounding pixel having a higher correlativity with the target pixel C.

When the isolated-point degree IP is set in such a manner through any processing of steps S56 to S58, the FPN correcting section 55 performs FPN correction processing, which will be described hereafter with reference to FIG. 9, based on the isolated-point degree IP (step S59).

It is thereafter determined whether the process has been finished for all the pixels (step S60). If it is determined that the process has not been finished yet, the position of the target pixel C is shifted (step S61) and then the flow returns to the above-described step S51, and the above-described processing is performed on the shifted target pixel C.

In contrast, if it is determined in step S60 that the process has been finished for all the pixels, the flow returns from the processing to the processing illustrated in FIG. 6.

Figure 8:
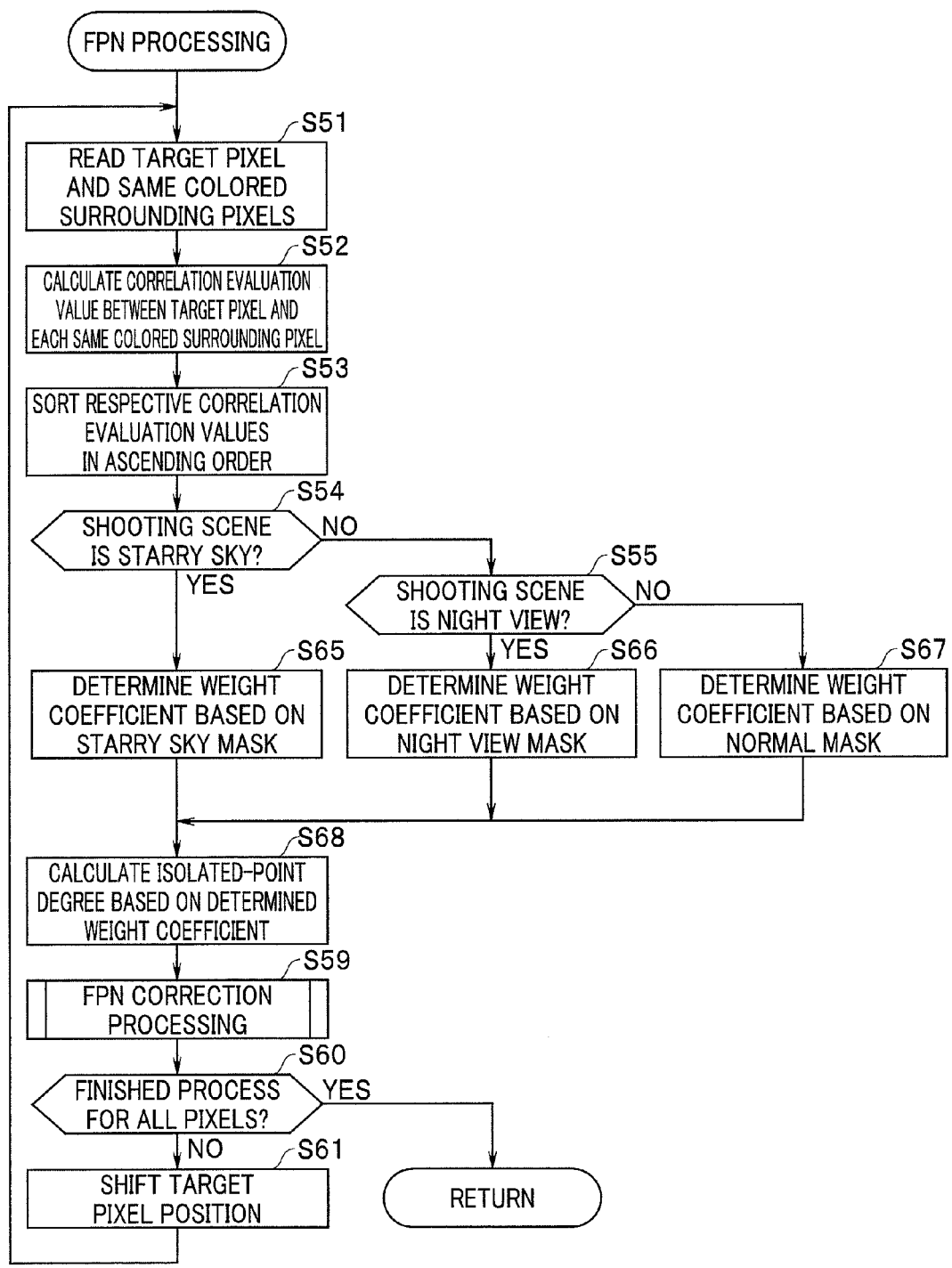
FIG. 8 is a flowchart illustrating in detail a modification of the FPN processing in step S42 of FIG. 6 in the embodiment 1.

FIG. 8 is a flowchart illustrating in detail a modification of the FPN processing in step S42 of FIG. 6. In the processing illustrated in FIG. 7, the weight coefficients K are set so as to be equal to the basic weight coefficients KB, but in the processing illustrated in FIG. 8, the weight coefficients K are set by multiplying the basic weight coefficient KB by masks M according to the shooting scene.

That is, when the processing is started, the processes of the above-described steps S51 to S54 are performed, and the processing of step S55 is also performed as needed.

The weight setting section 53 then determines the weight coefficients K(i) by multiplying the basic weight coefficients KB(REi) by starry sky masks M(i) as shown by the following Expression 10, whichever the shooting scene is.

$$K(i) = M(i) \times KB(REi) \quad \text{[Expression 10]}$$

First, if it is determined in step S54 that the shooting scene is the starry sky shooting scene, the starry sky masks M for imax=8 are defined as shown by the following Expression 11, $$M = (M(1), M(2), M(3), M(4), \quad \text{[Expression 11]}$$
$$M(5), M(6), M(7), M(8))$$
$$= (1, 0, 0, 0, 0, 0, 0, 0)$$

setting zero to the weights to the correlation evaluation values RE calculated from the surrounding pixels having lower correlativities with the target pixel C to substantially select the surrounding pixel used to calculate the correlation evaluation value RE, which is equivalent to selecting only the correlation evaluation value RE1 ranked in the first place as in step S56 illustrated in FIG. 7.

In such a manner, in the example of the basic weight coefficients KB shown by Expression 6, the weight setting section 53 determines the weight coefficient K as shown by the following Expression 12 (step S65).

$$K = (K(1), K(2), K(3), K(4), \quad \text{[Expression 12]}$$
$$K(5), K(6), K(7), K(8))$$
$$= (1.00, 0, 0, 0, 0, 0, 0, 0)$$

In addition, if it is determined in step S55 that the shooting scene is the night view shooting scene, the night view masks M are defined as shown by the following Expression 13, $$M = (M(1), M(2), M(3), M(4), \quad \text{[Expression 13]}$$
$$M(5), M(6), M(7), M(8))$$
$$= (1, 1, 1, 0, 0, 0, 0, 0)$$

setting zero to the weights to the correlation evaluation values RE calculated from the surrounding pixels having lower correlativities with the target pixel C to substantially select the surrounding pixel used to calculate the correlation evaluation value RE, which is equivalent to selecting the correlation evaluation values RE1 to RE3 ranked in the first to third places (more generally, from the first to the predetermined places) as in step S57 illustrated in FIG. 7.

In such a manner, in the example of the basic weight coefficients KB shown by Expression 6, the weight setting section 53 determines the weight coefficient K as shown by the following Expression 14 (step S66).

$$K = (K(1), K(2), K(3), K(4), \quad \text{[Expression 14]}$$
$$K(5), K(6), K(7), K(8))$$
$$= (1.00, 1.00, 0.33, 0, 0, 0, 0, 0)$$

In contrast, if it is determined in step S55 that the shooting scene is not the night view shooting scene, that is, the normal shooting scene, normal masks M are defined as shown by the following Expression 15, $$M = (M(1), M(2), M(3), M(4), \quad \text{[Expression 15]}$$
$$M(5), M(6), M(7), M(8))$$
$$= (1, 1, 1, 1, 1, 1, 1, 1)$$

which is equivalent to selecting the correlation evaluation values REi of all the ranks as in step S58 illustrated in FIG. 7.

In such a manner, the weight setting section 53 determines the weight coefficients K as K(i)=KB(REi) as with the above-described Expression 7, in the same manner as the basic weight coefficients KB as shown by Expression 6 (step S67).

When the weight coefficients K (i.e., K(1) to K(imax)) are determined in such a manner through any processing of steps S65 to S67, the isolated-point degree calculating section 54 calculates the isolated-point degree IP using the above-described Expression 9 (step S68). This makes the isolated-point degree IP calculated in step S65 identical to the isolated-point degree IP calculated in step S56 of FIG. 7, the isolated-point degree IP calculated in step S66 identical to the isolated-point degree IP calculated in step S57 of FIG. 7, and the isolated-point degree IP calculated in step S67 identical to the isolated-point degree. IP calculated in step S58 of FIG. 7, respectively.

The subsequent processes of steps S59 to S61 are the same as those of FIG. 7.

As seen from the above, the processing illustrated in FIG. 8 in which the weight coefficients K are determined in such a manner using the masks M according the shooting scene and the isolated-point degree IP is calculated using Expression 9 is equivalent to the processing illustrated in FIG. 7 in which the correlation evaluation values REi of up to appropriate ranks are selected according to the shooting scene and the isolated-point degree IP is calculated.

Figure 9:
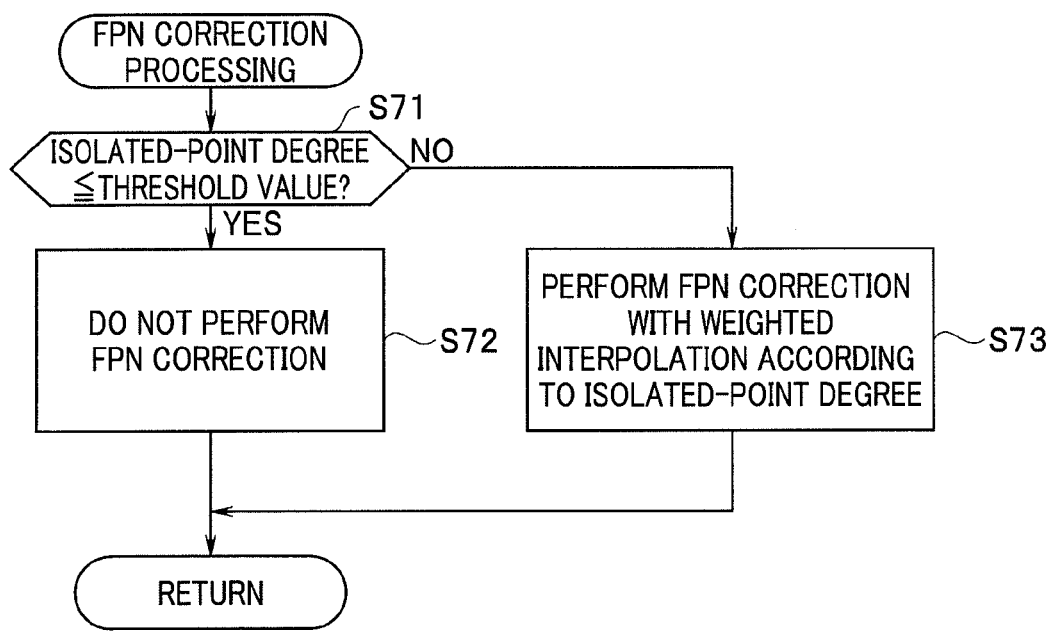
FIG. 9 is a flowchart illustrating in detail FPN correction processing in step S59 of FIG. 7 or FIG. 8 in the embodiment 1.

Subsequently, FIG. 9 is a flowchart illustrating in detail the FPN correction processing in step S59 of FIG. 7 or FIG. 8.

When the processing is started, it is determined whether the isolated-point degree IP calculated for the target pixel C is equal to or less than a predetermined threshold value (step S71).

If it is determined here that the isolated-point degree IP is equal to or less than the predetermined threshold value, the target pixel C is not determined to be an FPN and the FPN correction is not performed on the target pixel C (step S72).

Alternately, if it is determined in step S71 that the isolated-point degree IP is greater than the predetermined threshold value, weighted interpolation is performed according to the calculated isolated-point degree IP using the pixel value of the target pixel C and the pixel values of the surrounding pixels to perform the FPN correction on the target pixel C (step S73).

More specifically, when the pixel value of the target pixel C is denoted by V(0), a pixel value obtained based on pixel values V(i) of the surrounding pixels of i=1 to 8 is denoted by Vave, and a maximum value that the isolated-point degree IP can take on is denoted by IPmax, a pixel value V'(0) of the target pixel C after the FPN correction processing is calculated as a value obtained by subjecting the pixel value V(0) and the pixel value Vave to weighted mixture according to the isolated-point degree IP, as shown for example by the following Expression 16.

$$V'(0) = V(0) \times (IP/IP\text{max}) + Vave \times \{1 - (IP/IP\text{max})\} \quad \text{[Expression 16]}$$

Here, an example of the pixel value Vave obtained based on the pixel values V(i) of the surrounding pixels is the simple average of the pixel values V(i) of the surrounding pixels as shown by the following Expression 17, $$Vave = \frac{\sum_{i=1}^{i\max} V(i)}{i\max} \quad \text{[Expression 17]}$$

but may be a weighted average according to pixel-to-pixel distances or an average value calculated with higher precision using a weighted average or the like based on edge detection result.

Furthermore, the pixel value Vave used for the correction of the target pixel C is not limited to the average value of the pixel values V(i) of the surrounding pixels, and the median of the pixel values V(i) of the surrounding pixels may be used or a pixel value obtained based on the pixel values V(i) of the other surrounding pixels may be used as appropriate.

When the process of step S72 or step S73 has been performed, the flow returns from the processing to the processing illustrated in FIG. 7 or FIG. 8.

Next, FIG. 14 is a diagram illustrating an example of the pixel values of the target pixel C and neighboring same colored surrounding pixels. In a 3×3 pixel arrangement illustrated in this FIG. 14 and FIG. 15 to be described hereafter, a pixel positioned in the center is the target pixel C.

Assume that the example illustrated in this FIG. 14 is the case where the target pixel C is, for example, a star in a starry sky and is intended to avoid false detection to be an FPN.

At this point, for example, the technique described in the above Japanese Patent Application Laid-Open Publication No. 2007-81704 involves FPN detection in which the target pixel C is determined to be an isolated point when the absolute value of a difference value between the average pixel value of surrounding pixels and the pixel value of the target pixel C is equal to or greater than a predetermined threshold value.

More specifically, since the average pixel value of the surrounding pixels in the example illustrated in FIG. 14 is calculated to be (70×3+10×5)/8=32.5, the absolute value of the difference value is |80−32.5|=47.5. Therefore, to avoid the false detection that makes the target pixel C an FPN, a threshold value for determining whether the target pixel C is the FPN needs to be set at 48 or more.

In contrast, with the configuration of the present embodiment, when the shooting scene is determined to be the starry sky shooting scene, the correlation evaluation value ranked in the first place in the correlation evaluation value order is set to the isolated-point degree IP, and thus the isolated-point degree is IP=|80−70|=10. Therefore, the threshold value for determining whether the target pixel C is the FPN, that is, a determination threshold value in step S71 of FIG. 9 is to be sufficient if being set at 11 or more.

In such a manner, since the false detection can be restricted without increasing the FPN determination threshold value, the omission of FPN detection can be reduced. The description will be further made on the point with reference to FIG. 15.

FIG. 15 is a diagram illustrating the other example of the pixel values of the target pixel C and the neighboring same colored surrounding pixels.

The example illustrated in this FIG. 15 is the case where the target pixel C is a weak FPN the pixel value of which makes a small difference from those of the surrounding pixels and intended to avoid the omission of the FPN detection.

In the case of the technique described in the above Japanese Patent Application Laid-Open Publication No. 2007-81704, the following arithmetic is made in the example illustrated in this FIG. 15.

The average pixel value of the surrounding pixels is (10×8)/8=10, and the absolute value of the difference value is |40−10|=30. Therefore, using the threshold value for preventing the false detection as described above (48 or more) causes the target pixel C to be determined not to be an FPN, resulting in the omission of the detection.

In contrast, with the configuration of the present embodiment, since IP=|40−10|=30 calculated as the isolated-point degree is greater than the lower limit value 11 of the threshold value for preventing the false detection, the omission of the detection can be prevented as long as the threshold value is set between 11 and 29.

In such a manner, the configuration of the present embodiment enables both the restriction of the false detection and the reduction of the omission of the detection.

According to such Embodiment 1, the isolated-point degree of the target pixel is calculated by determining the shooting scene and performing the weight addition with heavy weights to the correlation evaluation values calculated from the surrounding pixels having higher correlativities with the target pixel when the shooting scene is the low correlation scene (conversely, when not being the low correlation scene, the isolated-point degree of the target pixel is calculated by performing the weight addition with the weights to the correlation evaluation values calculated from the surrounding pixels having lower correlativities with the target pixel taken into account to some extent). It is therefore possible to properly correct an FPN without depending on the mechanism of the image pickup apparatus (as a specific example, without making a shielding mechanism such as a mechanical shutter indispensable). Moreover, the FPN correction is based on the result of the shooting scene determination, and thus is correction with high robustness independent of an object.

At this point, correcting an FPN has advantages of not only being able to reduce the degradation of image quality but also of being hard to cause the degradation of image quality resulting from the false determination to be an FPN. For example, if the image of a star over a plurality of pixels in the starry sky shooting and the contour portion of the star image is subjected to the false determination to be an FPN, the contour of the star may be removed and the star may be made small, but in the case of the starry sky shooting scene, the false determination that determines the target pixel C to be an isolated point can be reduced since only the correlation evaluation values of surrounding pixels having high correlativities are taken into account and, which can reduces such loss of shape.

In addition, since an FPN is detected and corrected from acquired image itself, it is also possible to effectively reduce posterior FPNs that occur after product shipment.

Furthermore, there is no need of operations as in prior arts such as acquiring a dark image with a mechanical shutter closed and detecting an FPN, and registering a detected FPN in advance is, and thus usability can be enhanced saving trouble.

Then, in the case for example where an intense linear edge exists in an image and an FPN exists on the edge, if only surrounding pixels having high correlativities in a direction different from the direction of the edge is used for the isolated point detection, the false determination not to be an FPN may occur, but such false detection can be reduced because surrounding pixels having low correlativities are also used for the isolated point detection in the normal shooting scene not being the low correlation scene. Then, few extremely intense edges exist in the starry sky shooting scene being the low correlation scene, which has a high affinity with the shooting scene.

In addition, in the low correlation scene, surrounding pixels used to calculate the correlation evaluation values are substantially selected by setting zero to the weights to correlation evaluation values calculated from surrounding pixels having low correlativities with a target pixel, and thus an isolated point in the low correlation scene can be accurately detected without being influenced by the surrounding pixels having low correlativities.

Furthermore, heavier weights are set to correlation evaluation values calculated from surrounding pixels having high correlativities with a target pixel used to calculate an isolated-point degree according to how high the degree of being the low correlation scene is, and it is thus possible to properly detect an isolated point according to a shooting scene.

Then, heavier weights are set to correlation evaluation values calculated as an absolute difference value between the pixel value of a target pixel and the pixel values of the surrounding pixels as the correlation evaluation values become small, it is thus possible to make the evaluation of correlativity based on the absolute difference value, and to readily and properly calculate an isolated-point degree with weights according to the magnitude of the absolute difference value.

Additionally, the calculation of correlation evaluation values and the calculation of an isolated-point degree are made based on the four basic operations of arithmetic, and it is thus possible to perform processing suitable for computer arithmetic, which can shorten a time taken to perform the FPN detection processing.

In addition, the fixed pattern noise correction is performed by replacing at least part of the pixel value of a target pixel with the pixel values of surrounding pixels, and it is thus possible to perform correction with high affinity with the surrounding pixels.

Furthermore, in the case where an isolated-point degree is equal to or greater than a predetermined threshold value, the fixed pattern noise correction is performed with intensities according to an isolated-point degree, and it is thus possible to perform the correction with a high intensity on an intense FPN while the correction will not be performed on a pixel not being an FPN, which allows for acquiring a high-quality image from which the influence of FPN is sufficiently reduced.

Then, the fixed pattern noise correction is performed by the above-described Expression 16, and it is thus possible to perform the processing suitable for computer arithmetic, which can shorten a time taken to perform the FPN correction processing.

Additionally, the determination of a shooting scene is made using at least one of a focal distance, a luminance value, the set value of a fixed pattern noise correction intensity, a shooting time point, positional information, focus information, the amount of shake of the image pickup apparatus, the amount of movement of an object, luminance distribution information, an f-number, a shutter speed, and an ISO speed, and it is thus possible to perform simple scene determination based on various kinds of information obtained in connection with the acquisition of an image. At this point, using a plurality of kinds of information allows more accurate scene determination to be performed.

In addition, the starry sky shooting scene is determined to be the low correlation scene, and it is thus possible to effectively perform the FPN correction in the starry sky shooting in which a fixed pattern noise is readily made conspicuous.

At this point, the starry sky shooting scene is determined to have a higher degree of being the low correlation scene than night view shooting scene, and it is thus possible to more effectively perform the FPN correction on a starry sky shooting image that contains more point image objects having high luminance that are likely to be subjected to the false detection to be FPNs.

In addition, the image processing device is applied to an image pickup apparatus, and it is thus possible to perform the FPN correction in the image pickup apparatus and to acquire a high-quality image without additional operations after image pickup, which enhances the usability.

Note that although the above description has been provided mainly on an image processing device (and an image pickup apparatus to which the image processing device is applied), the present invention may be applied to an image processing method for performing processing similar to that by the image processing device, a processing program for causing a computer to perform the image processing method, a non-transitory computer-readable recording medium for recording the processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing device comprising:
   a shooting scene determining section that determines whether a shooting scene of an acquired image is a low correlation scene containing an object as an isolated point at which a correlativity between a target pixel and a surrounding pixel positioned in proximity to the target pixel is low;
   a correlation evaluation value calculating section that calculates a correlation evaluation value in plurality representing a correlativity between the target pixel and the surrounding pixel in plurality in the image, respectively;
   a weight setting section that sets a weight heavier to the correlation evaluation value calculated from the surrounding pixel having a high correlativity with the target pixel, when the shooting scene of the image is the low correlation scene than when the shooting scene is not the low correlation scene;
   an isolated-point degree calculating section that subjects the correlation evaluation value in plurality calculated by the correlation evaluation value calculating section to weight addition according to the weight to calculate an isolated-point degree of the target pixel; and
   a fixed pattern noise correcting section that corrects a pixel value of the target pixel based on a pixel value of the surrounding pixel according to a magnitude of the isolated-point degree.

2. The image processing device according to claim 1, wherein when a degree to which the shooting scene of the image is the low correlation scene is higher than a predetermined threshold degree, the weight setting section sets a weight to zero to the correlation evaluation value calculated from the surrounding pixel having a low correlativity with the target pixel, so as to substantially select a surrounding pixel used to calculate the correlation evaluation value.

3. The image processing device according to claim 1, wherein the shooting scene determining section performs determination of the shooting scene using at least one of a focal distance of a shooting optical system when the image is acquired, a luminance value of the image, a set value of a fixed pattern noise correction intensity, a shooting time point of the image, positional information on acquisition of the image, focus information, an amount of shake of an image pickup apparatus when the image is acquired, an amount of movement of an object in the image, luminance distribution information on the image, an f-number, a shutter speed, and an ISO speed.

4. The image processing device according to claim 1, wherein the shooting scene determining section determines a starry sky shooting scene to be the low correlation scene.

5. The image processing device according to claim 2, wherein
   the shooting scene determining section further determines the degree to which the shooting scene of the image is the low correlation scene, and
   when the shooting scene of the image is the low correlation scene, the weight setting section further sets a weight heavier used to calculate the isolated-point degree to the correlation evaluation value calculated from the surrounding pixel having a high correlativity with the target pixel according to how high the degree of being the low correlation scene is.

6. An image pickup apparatus, comprising:
   the image processing device according to claim 1; and
   an image pickup section that picks up and acquires an image, wherein
   the image processing device processes the image acquired by the image pickup section.

7. The image processing device according to claim 5, wherein the shooting scene determining section determines a starry sky shooting scene and a night view shooting scene to be the low correlation scene, and further determines that the starry sky shooting scene has a higher degree of being the low correlation scene than the night view shooting scene.

8. The image processing device according to claim 5, wherein the correlation evaluation value calculating section and the isolated-point degree calculating section perform calculation of the correlation evaluation value and calculation of the isolated-point degree based on four basic operations of arithmetic.

9. The image processing device according to claim 8, wherein
   the correlation evaluation value calculating section calculates the correlation evaluation value as an absolute difference value between the pixel value of the target pixel and the pixel value of the surrounding pixel, and
   the weight setting section further sets a weight heavier to the correlation evaluation value that is not set to zero as the correlation evaluation value becomes smaller.

10. The image processing device according to claim 9, wherein when the isolated-point degree is equal to or greater than the predetermined threshold value, the fixed pattern noise correcting section replaces at least a part of the pixel value of the target pixel with the pixel value of the surrounding pixel, with an intensity according to the isolated-point degree.

11. The image processing device according to claim 10, wherein the fixed pattern noise correcting section calculates the pixel value of the target pixel after correction as a value obtained by subjecting the pixel value of the target pixel and a pixel value obtained based on pixel values of the surrounding pixel in plurality to weighted mixture according to the isolated-point degree.

12. An image processing method, comprising:
   a shooting scene determining step of determining whether a shooting scene of an acquired image is a low correlation scene containing an object as an isolated point at which a correlativity between a target pixel and a surrounding pixel positioned in proximity to the target pixel is low;
   a correlation evaluation value calculating step of calculating a correlation evaluation value in plurality representing a correlativity between the target pixel and the surrounding pixel in plurality in the image, respectively;
   a weight setting step of setting a weight heavier to the correlation evaluation value calculated from the surrounding pixel having a high correlativity with the target pixel, when the shooting scene of the image is the low correlation scene than when the shooting scene is not the low correlation scene;
   an isolated-point degree calculating step of subjecting the correlation evaluation value in plurality calculated in the correlation evaluation value calculating step to weight addition according to the weight to calculate an isolated-point degree of the target pixel; and
   a fixed pattern noise correcting step of correcting a pixel value of the target pixel based on a pixel value of the surrounding pixel according to a magnitude of the isolated-point degree.

* * * * *